Jan. 15, 1957 M. C. ANDREWS 2,777,228

FINGER DIAL FOR DIAL TELEPHONES

Filed March 3, 1954

INVENTOR

M.C.Andrews

BY John N. Randolph

ATTORNEY

United States Patent Office 2,777,228

Patented Jan. 15, 1957

2,777,228

FINGER DIAL FOR DIAL TELEPHONES

Malcolm C. Andrews, Williamsport, Pa.

Application March 3, 1954, Serial No. 413,835

2 Claims. (Cl. 40—10.5)

This invention relates to an improved finger dial for use with conventional dial telephones and has for its primary object to provide an improved finger dial to enable dialing of the telephone in the dark.

Another and particularly important object of the present invention is to provide an improved rotatable finger dial capable of being effectively employed by the blind.

Still another object of the invention is to provide an improved finger dial which may be readily attached to a conventional dial telephone to function in conjunction therewith and which will be durable and effective in accomplishing its intended results.

Various other objects and advantages of the invention will hereinafter become more fully apparent from the following description of the drawing, illustrating presently preferred embodiments thereof, and wherein.

Figures 1, 2, 3, 4, 5:
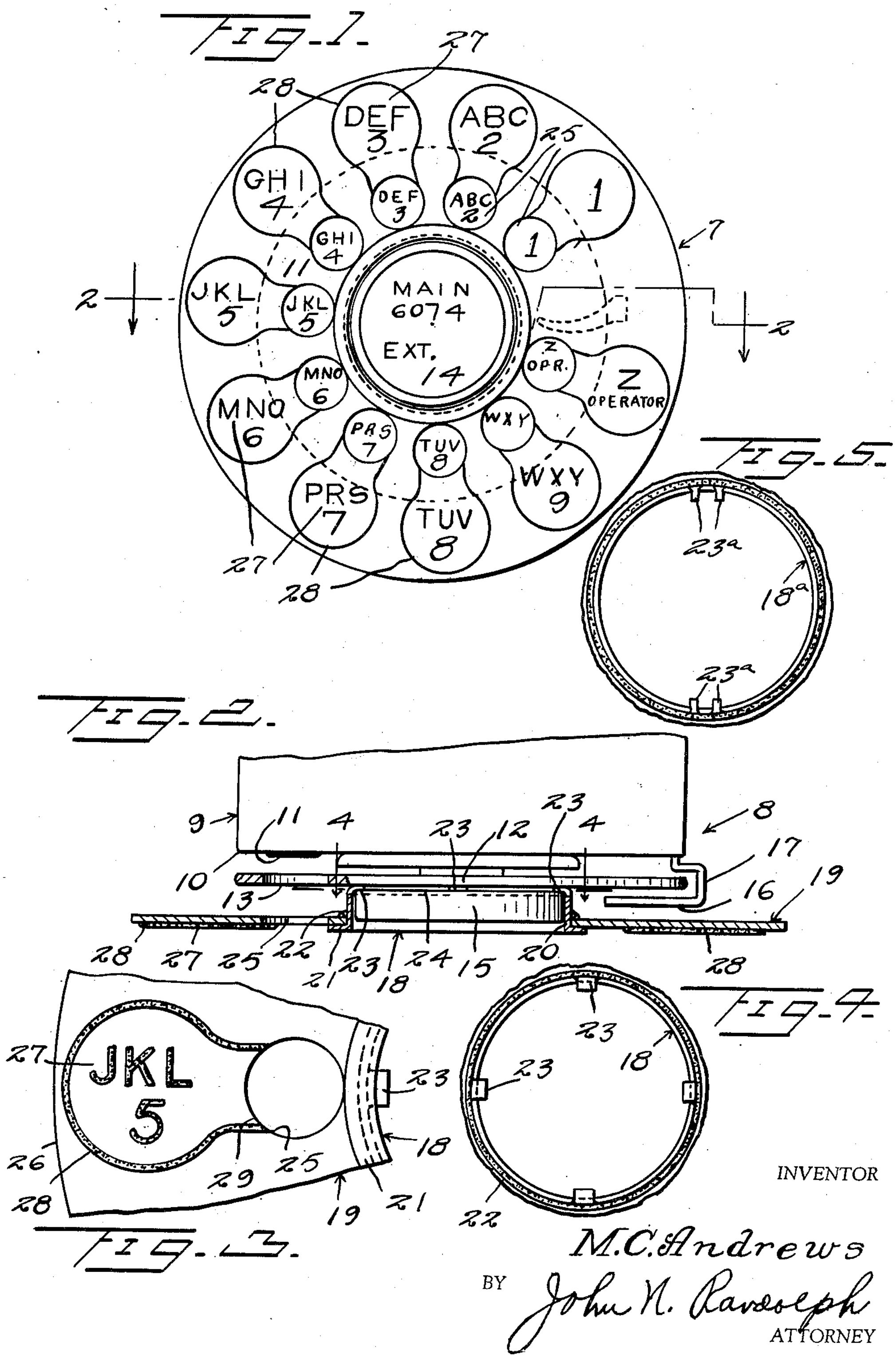
Figure 1 is a plan view of the improved rotatable finger dial, illustrating one embodiment thereof shown in an applied position.
Figure 2 is an enlarged sectional view, partly in elevation, taken substantially along a plane as indicated by the line 2—2 of Figure 1.
Figure 3 is an enlarged fragmentary plan view of a small segment of the rotatable finger dial.
Figure 4 is a fragmentary sectional view taken substantially along a plane as indicated by the line 4—4 of Figure 2 and illustrating one form of mounting of the invention.
Figure 5 is a view similar to Figure 4 illustrating another form of mounting of the invention.

Referring more specifically to the drawing, the improved rotatable finger dial, designated generally 7 and comprising the invention, has been illustrated as an attachment to be applied to the conventional rotatable finger dial. However, as the description proceeds it will be readily apparent that the improved finger dial 7 may replace the conventional finger dial.

For the purpose of illustrating one application and use of the improved rotatable finger dial 7, a portion of a conventional dial type telephone has been illustrated in the drawing and is designated generally 8. Said dial telephone portion includes a base portion 9 having an annular surface 10 containing the usual telephone symbols 11. A conventional rotatable finger dial 12 is rotatably disposed over the base surface 10 and is provided with the usual finger openings 13 which are normally disposed in alignment with the groups of symbols 11. The rotatable finger dial 12 includes a central disc 14 adapted to contain indicia constituting the number of the telephone 8 and which is supported by a relatively wide ring or annular wall 15 which projects outwardly from the surface of the finger dial 12. The telephone 8 is provided with the usual finger stop 16 which is disposed on the outer side of the outer portion of the finger dial 12 and which is so located as to limit clockwise rotation of each of the finger dial openings 13. The finger stop 16 is fixed to and extends from the base 9 and includes a portion 17 which is radially spaced outwardly with respect to an adjacent portion of the periphery of the rotatable finger dial 12. The parts 8 through 17 constitute no part of the improved finger dial 7 but have merely been illustrated and described to afford a better understanding thereof.

The improved finger dial 7 has been illustrated in a form thereof intended for use as an attachment to the telephone 8 without removal of any of the conventional parts of the telephone and comprises a relatively wide inner annular supporting member 18 and an annular member 19. The annular member 19 is relatively wide in a radial direction whereas the width of the supporting member 18 is disposed transversely of the plane of the member 19. A central opening 20 of the improved dial member 19 is sized to fit snugly around the annular supporting member 18. Said supporting member 18 has an outturned flange at its outer edge as seen at 21 which bears against the outer surface of the inner portion of the dial member 19. The dial member 19 is secured immovably to the supporting member 18 by any suitable bonding means 22, as seen in Figures 2 and 4. In the form as illustrated in Figures 2, 3 and 4, the inner edge of the supporting member 18 is provided with a plurality of circumferentially spaced extensions or tongues 23. The bore of the supporting member 18 is sized to fit relatively snug around the wall 15 and after being applied thereto, the tongues 23 are bent inwardly to engage a slot 24 of the wall 15 or a plurality of circumferentially spaced openings or slots, if such are provided in lieu of the single slot 24. Walls 15 of certain conventional dial telephones are provided with oppositely arranged pairs of spaced openings. For such telephones, a supporting member 18a as illustrated in Figure 5 is utilized. Said member 18a differs from the member 18 in that in lieu of the tongues 23, the member 18a is provided with two pairs of tongues 23a properly spaced relatively to one another to engage the openings or notches provided in the wall 15. It will also be apparent that the tongues 23 and 23a merely illustrate one means of attaching the improved finger dial 7 to the conventional finger dial 12 and numerous other means may be employed including, for example, merely a tight frictional engagement between the supporting member 18 and the wall 15.

The improved dial member 19 is provided with openings 25 corresponding to the openings 13 and said member 19 is secured to the supporting member 18 or 18a and the supporting member 18 or 18a is secured to the wall 15, so that the openings 25 will be in registration with the openings 13. The outer side or surface of the dial member 19 between each of its openings 25 and its periphery 26 is provided with one or a group of embossed or raised symbols 27 corresponding to the symbol or group of symbols 11 normally aligned with and visible through said opening 25. The embossed symbols 27 are formed of or coated with a luminous material, so that said symbols can be readily seen in the dark. A raised border 28 is provided around each group of symbols 27 and around the single symbol "1", each border 28 having an open end 29 which is connected with the adjacent radially aligned opening 25.

From the foregoing it will be readily apparent that with the improved finger dial 7 the telephone 8 may be readily dialed in the dark as the groups of symbols 27 will be clearly visible so that the user may place his or her finger into the opening 25 which is in radial alignment with the desired group of symbols 27 and may then turn the finger dials 7 and 12 in unison until the finger protruding through the opening 25 strikes the finger stop 16. Thus, the telephone 8 can be dialed in substantially a conventional manner. Likewise, the embossed symbols 27 will enable a blind person to dial the telephone 8 by feel or touch and the raised borders 28 will guide the finger from the groups of symbols 27 into the radially aligned openings 25.

The width of the annular supporting member 18 may be decreased, if desired, to locate the dial number 19 closer to the finger stop 16.

It will likewise be readily apparent that the improved dial 7 may replace the conventional dial 12 by providing the central portion of the dial 7 with a structure corresponding to the central portion of the conventional dial 12 and omitting the supporting member 18 or 18*a*. When so utilized, the finger stop 16 is elongated and its portion 17 is offset outwardly from its position as illustrated in Figure 2 to accommodate the increased diameter of the improved finger dial 7.

The improved dial 7 may be formed of any suitable material such as metal or plastic.

Various other modifications and changes are contemplated and may obviously be resorted to, without departing from the spirit or scope of the invention as hereinafter defined by the appended claims.

I claim as my invention:

1. An improved rotatable telephone finger dial for dial telephones having spaced finger receiving openings radially spaced from the periphery of the dial, the outer surface of said dial between said openings and the periphery thereof being provided with groups of luminous symbols, the different groups of symbols being arranged substantially in radial alignment with said finger openings, said groups of symbols being embossed or raised relatively to the outer surface of the dial, and a raised or embossed border on the dial surrounding each group of symbols and having an inner open end opening into the adjacent finger opening.

2. In combination with a rotatable telephone finger dial having a raised circular central portion and a plurality of spaced finger receiving openings surrounding said central portion and disposed in spaced relation to one another; an annular auxiliary finger dial having a central opening sized to fit around said raised central portion, means associated with said auxiliary finger dial for connecting the auxiliary dial to said raised central portion for rotation of the dials as a unit, said auxiliary finger dial having a plurality of openings arranged in a circle and in spaced apart relation to one another corresponding to the spacing between said finger receiving openings and maintained by said means in alignment therewith, the openings of said auxiliary dial being spaced inwardly from the periphery of said auxiliary dial, said auxiliary dial having an annular top surface of substantial radial width disposed between the openings thereof and its periphery, said annular top surface being provided with groups of raised or embossed symbols, the different groups of symbols being disposed substantially in radial alignment with the openings of the auxiliary dial, and said top surface having raised or embossed borders surrounding said groups of symbols and having open inner ends opening into the adjacent openings of the auxiliary dial.

References Cited in the file of this patent

UNITED STATES PATENTS

| | | |
|---|---|---|
| 1,765,445 | Porter | June 24, 1930 |
| 1,896,352 | Fiveash | Feb. 7, 1933 |
| 2,198,935 | Dormont | Apr. 30, 1940 |
| 2,231,103 | Baker | Feb. 11, 1941 |
| 2,299,257 | Simon | Oct. 20, 1942 |
| 2,413,974 | Hultgreen | Jan. 7, 1947 |
| 2,509,833 | Miller | May 30, 1950 |
| 2,546,483 | Venters | Mar. 27, 1951 |

FOREIGN PATENTS

| | | |
|---|---|---|
| 22,205/35 | Australia | Apr. 30, 1936 |